Feb. 3, 1953 F. F. BAKER 2,627,201
STEREOSCOPIC ATTACHMENT FOR USE WITH CAMERAS
Filed Aug. 23, 1949 2 SHEETS—SHEET 1
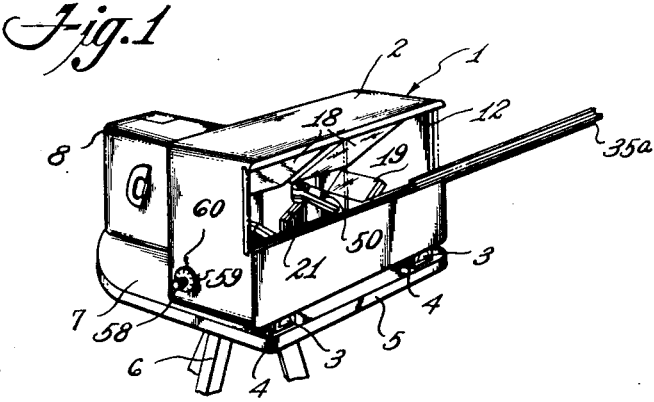
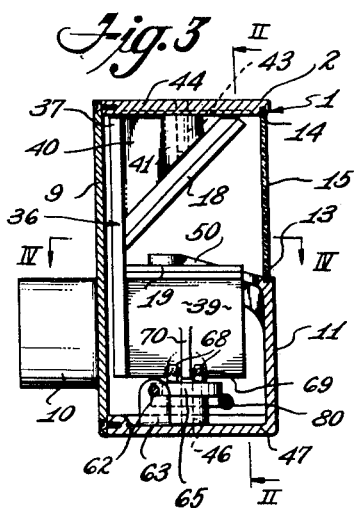
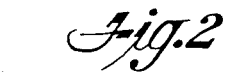
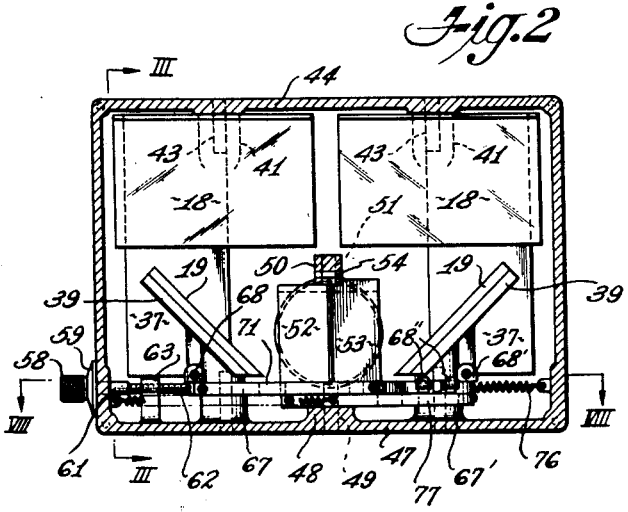
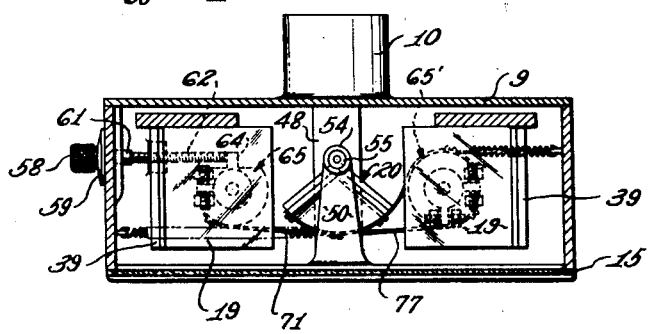
INVENTOR.
FRIEND F. BAKER
BY
Attorney Feb. 3, 1953  F. F. BAKER  2,627,201
STEREOSCOPIC ATTACHMENT FOR USE WITH CAMERAS
Filed Aug. 23, 1949  2 SHEETS—SHEET 2
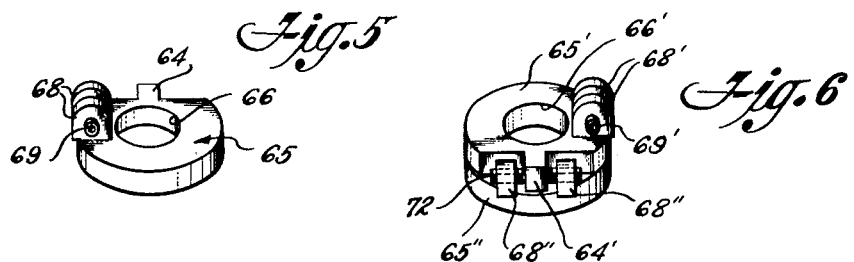
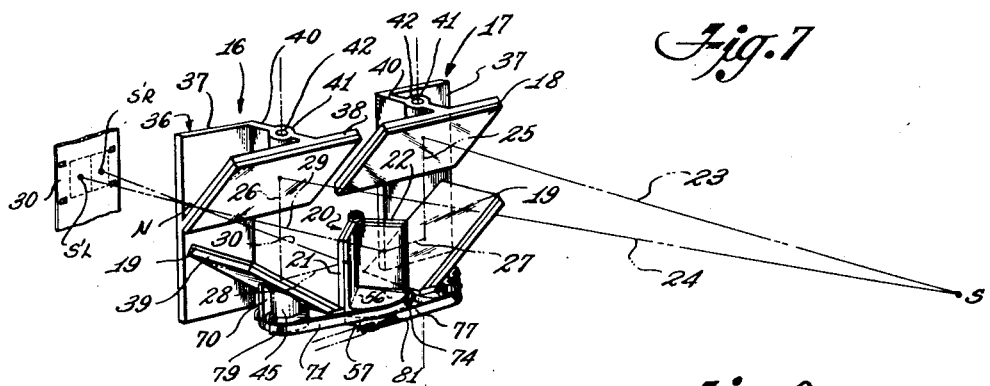
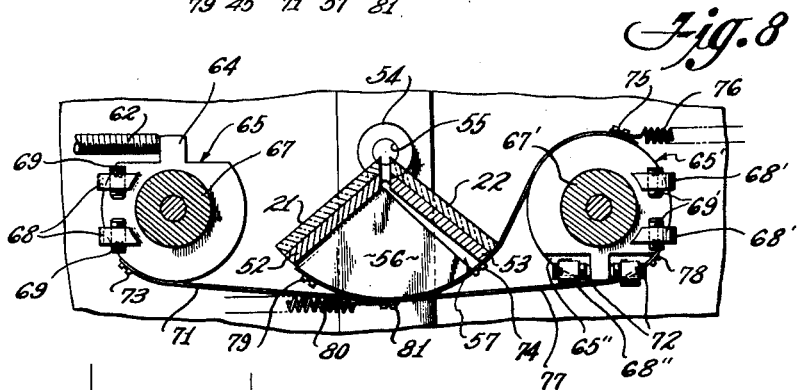
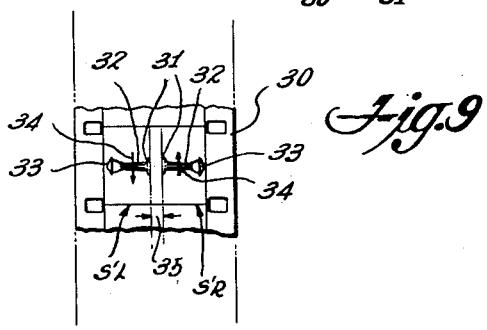
INVENTOR.
FRIEND F. BAKER
BY
Attorney Patented Feb. 3, 1953

2,627,201

UNITED STATES PATENT OFFICE 2,627,201

STEREOSCOPIC ATTACHMENT FOR USE WITH CAMERAS

Friend F. Baker, Los Angeles, Calif., assignor to Baker & Worth, Incorporated, Los Angeles, Calif., a corporation of California Application August 23, 1949, Serial No. 111,800

12 Claims. (Cl. 88—16.6)

This invention relates to stereoscopic apparatus and has particular reference to a stereoscopic attachment for photographic cameras which finds particular utility when employed with motion picture cameras and projectors.

In the photographic art, it is well known to obtain a stereoscopic effect with a single camera by the use of an image-splitter to record on the photographic film separate images of the subject as seen from the right and left eye locations. For an observer of the recorded images to obtain a stereoscopic impression, it is only necessary to so limit his vision as to permit his right eye to see only the right eye image (the image of the subject as seen from the right eye location), and to permit his left eye to see only the left eye image.

In pictures intended for projection, as for example, motion pictures, the limitation of the observer's vision is commonly realized by projecting the two images through separate polarizing media so as to produce upon the projection screen superimposed and registered images in plane polarized light, the planes of polarization of which are at right angles to each other. A screen material is selected which does not destroy the polarization of the light reflected to the observer from the screen. By wearing spectacles made of polarizing media set with their axes at right angles, the observer limits his vision in the manner described, and obtains a stereoscopic impression.

The apparatus used prior to this invention for obtaining a stereoscopic impression in the manner described is characterized by numerous disadvantages. Image-splitters known prior to this invention distort the field of view of the camera and produce a badly proportioned picture. For example, ordinary sixteen-millimeter motion picture film may be assumed to provide an individual frame area approximately seven and one-half millimeters high by ten millimeters wide (actually, 0.294 inch by 0.410 inch). When this film is used with the conventional image-splitter, the apparatus operates to divide the frame area lengthwise of the film strip so as to record the right and left eye images on areas which are each ten millimeters high by less than four millimeters wide.

This proportioning of the resulting picture yields a field width which is but one-half of the normal width, while the field height has been maintained unimpaired. Unfortunately, the usual photographic subjects require a greater field width than field height. Furthermore, the majority of observers are accustomed to seeing projected pictures which are approximately one and one-third times as wide as they are high. The inversion of these dimensions and the projection of a tall, narrow picture is undesirable since the strange and unfamiliar shape of the picture itself tends to detract from the subject matter intended to be portrayed. This difficulty can only be resolved with the conventional image-splitters by turning the motion picture camera on its side. This, of course, requires also that the motion picture projector be turned on its side if the projected pictures are to stand upright on the screen. Such a procedure is hardly feasible.

Another difficulty attendant upon the use of the prior image-splitting devices resides in their inability to establish the correct parallax. In the prior devices, it is customary to adjust the optical elements at the factory so that the point of binocular convergence is disposed approximately in the middle of the depth of field. When a picture taken with such an apparatus is viewed stereoscopically, objects lying in the plane of binocular convergence appear to be situated at the location of the projection screen, and background objects appear to be behind the screen. Foreground objects, however, actually appear to be disposed in front of the screen. This effect is not particularly disturbing if the principal subject of interest of the picture is located at the middle distance or background locations. However, if the principal subject of interest is located in the foreground, then that principal subject seems to be disposed between the observer and the screen, and this produces a disturbing sensation of unreality in the observer which completely spoils the effect desired.

Further, image-splitting devices at present available provide no adjustment for permitting the user of such apparatus to maintain or adjust the alignment of the optical elements so as to produce a properly registered set of images upon projection. While the image-splitters now available are generally well made and accurately aligned at the time of manufacture, a certain amount of misalignment results from ageing and from hard usage. Whenever this misalignment is of such a minor character as to not justify sending the apparatus back to the factory for rebuilding or readjustment, the user of the apparatus is usually obliged to continue to produce inferior pictures when the provision of a suitable adjustment means would allow the user of the apparatus to correct the difficulty with little effort.

Finally, the image-splitting devices known prior to this invention include no means for preventing an overlapping of the two images produced without altering or modifying the cameras with which they are to be used. Since, on projection, it is necessary to maintain the separate identity of the two images until they are combined on the screen, this defect makes many of the existing devices useless or at least incapable of perfectly accomplishing the desired result.

It is therefore an object of this invention to provide a stereoscopic attachment for motion picture cameras and projectors which overcomes the above noted disadvantages by dividing the conventional frame area into two properly proportioned areas with the images impressed upon those areas in the same orientation as is occupied by a single image in the operation of an ordinary camera.

It is a still further object of this invention to provide an attachment of the character set forth in the preceding paragraphs in which the images are rotated before being passed to the camera so that the images which are recorded on the film are disposed with their heights extending transversely of the length of the film strip.

It is an additional object of this invention to provide an image-splitter of the character set forth in the preceding paragraphs in which the conventional frame area of a motion picture film strip is divided lengthwise into two frame areas disposed side-by-side on the film strip and in which the images are rotated by the stereoscopic attachment to dispose their heights parallel to the short dimension of their individual frame areas.

It is also an object of this invention to provide a stereoscopic attachment of the character described which includes a plurality of optical elements for producing binocular images of an object situated in the field of view together with means for adjusting the relation of the optical elements to vary the distance to the point of binocular convergence.

It is also an object of this invention to provide an apparatus of the character set forth which includes additionally a calibrated control device for adjusting the relation of the optical elements to permit the apparatus to be set to a desired distance to the point of binocular convergence.

It is a still further object of this invention to provide an apparatus of the character set forth which includes independent adjusting means for at least a part of said optical elements to permit the proper positioning and alignment of the two binocular images relative to each other.

It is another object of this invention to provide an apparatus of the character described which includes a mask or mat for obscuring such portion of the incoming light rays as to provide on the film an unexposed area dividing the two images and preventing undesired overlap thereof.

Other objects and advantages of this invention will be apparent from a consideration of the following specification, read in connection with the accompanying drawings, in which:

Figure 1 is a perspective view illustrating the preferred embodiment of this invention as applied to a motion picture camera of the amateur type;

Figure 2 is a cross-sectional view of the attachment proper, taken substantially along the line II—II of Figure 3;

Figure 3 is a cross-sectional view taken substantially along the line III—III of Figure 2;

Figure 4 is a horizontal sectional view taken substantially along the line IV—IV of Figure 3;

Figure 5 is a perspective view illustrating the construction of an adjustment mechanism associated with the optical elements of the apparatus;

Figure 6 is a perspective view similar to Figure 5, but showing another of the adjustment means;

Figure 7 is a diagrammatic perspective view illustrating the mode of operation of the device to produce binocular images suitable for stereoscopic projection;

Figure 8 is a fragmentary, sectional view taken substantially along the line VIII—VIII of Figure 2, and showing the details of construction of one of the adjustment means; and Figure 9 is a fragmentary view representing the form and position of the binocular images produced upon a section of motion picture film strip.

In the ensuing description, the apparatus of this invention is described as comprising an attachment apparatus which may first be used in connection with a motion picture camera in the taking of the pictures, and then later used in connection with a suitable motion picture projector to project and superimpose the binocular images upon the projection screen. It will be obvious, however, to those skilled in this art that the apparatus may be constructed as a permanent part of a camera and/or projector without departing from the spirit of the invention.

Referring to the drawings, the preferred embodiment of the invention is illustrated as comprising an attachment apparatus indicated generally by the reference character 1. This apparatus comprises a housing 2 which is preferably provided with dovetail guides 3, cooperating with similarly shaped guides 4 mounted upon a base plate 5 adapted to be secured to the head of a conventional tripod 6, and providing a portion 7 upon which a conventional motion picture camera 8 may be secured. The guides 3, 4 are provided to permit the attachment 1 to be removed from its associated relation with the camera and later replaced in such a way as to insure proper optical alignment of the apparatus with the camera.

As is best shown in Figures 2, 3, and 4, the housing 2 is preferably formed as a solid box having a removable back 9 which carries a tubular shield 10 adapted to pass over the lens barrel of the camera 8 to exclude from the camera lens any undesired extraneous light. The front wall 11 of the housing 2 is provided with an elongated window 12, the edges of which are channeled as indicated at 13 and 14, to receive auxiliary optical elements, such as is represented in Figure 3 at 15. These auxiliary elements may comprise photographic filters of the usual type for use when the attachment device is associated with the camera 8, and will comprise polarizing media when the device is operatively associated with the projection apparatus.

The optical elements which are contained within the housing 2 are illustrated diagrammatically in perspective in Figure 7. The apparatus includes two inverting assemblies indicated generally by the reference characters 16 and 17. Each of these assemblies comprises an objective reflector 18, and an intermediate reflector 19. The inverting assemblies 16 and 17 cooperate with a collimator indicated generally at 20, and comprising a right collimating reflector 21 and a left collimating reflector 22.

The angular relations among the various reflectors is best described with reference to their action upon the light rays which are transmitted through the apparatus. Rays of light 23 and 24, originating, for example, at a subject S, strike the two objective reflectors 18 and are thereby turned vertically as is represented at 25 and 26. The rays 25 and 26 strike the two intermediate reflectors 19 and are turned thereby in a horizontal direction and toward each other, as is shown at 27 and 28. The approaching rays 27 and 28 are reflected by the collimating reflectors 21 and 22 along generally converging paths represented by the dash lines 29 and 30. The rays 29 and 30 converge at the point N which is arranged to be located at the nodal point of the photographic objective of the camera 8. The photographic objective serves to cast upon a film 30 two images $S'_L$ and $S'_R$ comprising the left and right eye view points of the subject S.

The optical system just described thus serves to produce upon the film 30 two images of the subject S, as seen respectively from the location of the right and left objective reflectors 18. The inversion assemblies 16 and 17 serve to rotate the images through 90° so that the images $S'_L$ and $S'_R$ are recorded on the motion picture film strip 30 in the fashion represented diagrammatically in Figure 9.

Figure 9 represents the images produced by the observation of a lamp standard comprising a base 31, a standard 32, a lamp 33, and having a directional arrow 34 secured to the standard 32. It will be seen from an inspection of Figure 9 that the right and left eye images of this subject are disposed on the film strip 30 with the bases 31 adjacently disposed and with the height of the subject (the length of the standard 32) extended horizontally or transversely of the length of the strip 30. The tops of the subject, represented by the lamp 33, are disposed in the images at the outermost edges of the strip 30. Attention is directed to the fact that by rotating the images 90° as described, the height of the subject is extended across the short dimension of the frame area occupied by that image, so as to bear the same relation to the frame dimensions as is the usual practice in taking single full frame pictures as with a conventional motion picture camera.

The apparatus is preferably so adjusted as to provide a separation between the two frame areas represented by the images $S'_L$ and $S'_R$. This separation, indicated by the dimension line 35, in Figure 9, is preferably made of the order of magnitude of 0.010 inch. Thus, using conventional sixteen-millimeter motion picture film having a normal frame area 0.410 inch wide by 0.294 inch high, one is able to obtain similarly proportioned images $S'_L$ and $S'_R$, having widths of 0.294 inch and heights of 0.200 inch. It is likewise readily seen that this serves to produce a field of view of approximately 70% of the angular scope of the field of view of the camera without the stereoscopic attachment. If the images were not rotated by the inverting assemblies 16 and 17, but instead stood upright in the frame areas $S'_L$ and $S'_R$, the lateral field of view of the camera would be reduced to less than half that of the normal lateral field of view.

The described separation of the images represented by the dimension line 35 is obtained by the use of a matt or masking element 35a adapted to be received in and supported by the lower channel 13 so as to obscure a narrow strip across the bottom of the window opening 12. The matt 35a is shown in Figure 1 as being partially removed or slid to one side, it being understood that in operation the matt 35a is slid to the left of the position shown so as to extend completely across the lower edge of the opening 12.

Since the inversion assemblies 16 and 17 rotate the images 90°, it is seen that the bottom edge of the window 12 corresponds to the adjacent sides of the images. Thus, by masking off a part of the lower edge of the window opening, there is provided a separation of the two images. The degree of this separation may be increased or decreased as desired by increasing or decreasing the width of the matt 35a.

The inverting assemblies 16 and 17 are identical and each preferably includes a supporting member 36 comprising a laterally extending vertical plate 37 from which extends an angularly inclined plate 38 upon which the objective reflector 18 is secured by suitable means as by clips or an adhesive. A similarly inclined plate 39 carried by the vertical plate 37 is used to support the intermediate reflectors 19. The reflector supports 38 and 39 may conveniently be formed integrally with the back plate 37 as by a casting process. Also, a wedge-shaped vertical member 40 preferably extends between the plates 37 and 38 and includes a boss portion 41 which is bored as indicated at 42 to receive a stub shaft 43 carried by a top plate portion 44 of the housing 2. In a similar way, a boss portion 45 is formed integrally with the reflector support 39 and extends downwardly therefrom. The boss 45 is bored to receive an upstanding stub shaft 46 carried by a lower base portion 47 of the housing 2. The shafts 43 and 46 serve to support the inverting assemblies 16 and 17 for angular adjusting movement about a vertical axis for a purpose which will be more fully explained hereinafter.

The base portion 47 of the housing 2 is also formed near its center with a boss 48, terminating in an upper plane surface and surrounding a vertically extending stub shaft 49 suitably secured within the boss 48. A laterally extending bracket 50 is secured to or formed integrally with the front face 11 of the housing 2, and supports at its outermost end a short pin or stub shaft 51 which is axially aligned with the stub shaft 49. The stub shafts 49 and 51 support the reflectors of the collimator 20. These reflectors are mounted upon supporting plates 52 and 53 which carry on their upper adjacently disposed corners forwardly extending lugs 54 which are bored as indicated at 55 to receive the upper pin 51. One of the supporting plates, for example, the plate 52, is secured to or formed integrally with a horizontal arcuate member 56. The member 56 includes a portion which surrounds the lower stub shaft 49 so as to journal the reflector support 52 for rotation about the axis defined by the pins 49 and 51. The other supporting plate 53 is similarly formed with a sector-shaped portion 57 which underlies the portion 56 as is shown in Figure 7. This construction provides for the independent angular adjustment of the reflectors 21 and 22 about the vertical axis defined by the pins 49 and 51. The reflectors 21 and 22 are so proportioned and so located on their supports 52 and 53 as to cause the axis defined by the pins 49 and 51 to lie in the planes of the reflectors 21 and 22.

Adjustment of the angular orientation of the reflectors hereinbefore mentioned to vary the distance to the point of binocular convergence is effected by means of a control member 58. The member 58 may conveniently comprise a knurled knob formed integrally with a dial member 59 which may be suitably calibrated in feet representative of the distance from the camera to the point of binocular convergence. The graduations on the dial 59 may be read with reference to an index 60 inscribed on the end face of the housing 2.

The control member 58 is secured to a shaft 61 which is journaled for rotation in the end member of the housing 2, and which is slidably connected as by means of a spline (not shown) to a threaded shaft 62 threadedly engaged with a suitably tapped bore formed in a lug 63 upstanding from the base portion 47. Rotation of the knob 58 rotates the screw 62, which by reason of its threaded engagement with the boss 63 moves axially in response to rotation of the knob 58.

As is best shown in Figures 5, 6, and 8, the end of the threaded shaft 62 is positioned to bear against a radially extending lug 64 formed on an adjustment member indicated generally at 65 in Figure 8, and illustrated in detail in Figure 5. The adjustment member 65 comprises a washer-like element bored, as indicated at 66, and rotatably mounted upon a shouldered boss 67 upstanding from the base portion 47 of the housing 2. A pair of spaced, upstanding ears 68 provided on the adjustment member 65 are bored and tapped to receive adjusting screws 69. The adjusting screws 69 are normally positioned with their inner ends spaced apart a distance sufficient to receive a vertically depending rib 70 formed on the boss 45 of the intermediate reflector support. With the angular position of the adjustment member 65 fixed by the engagement of the lug 64 with the screw 62, the angular position of the inverting assembly 16 is subject to adjustment through the medium of the screws 69, one being advanced while the other is retracted.

A similar adjustment means associated with the inverting assembly 17 is represented generally by the reference character 65', and is illustrated in detail in Figure 6, wherein parts identical to those shown in Figure 5 are identified by like reference characters distinguished by the addition of the prime. The adjustment means 65' is rotatably mounted upon a shouldered boss 67' upstanding from the base portion 47 and corresponding to the boss 67 previously mentioned.

The horizontal surface defined by the shoulder of the boss 67' is lower than that of the boss 67 to provide a space between the underside of the adjustment member 65' and the shoulder surface within which is received a drive member 65''. The drive member 65'' is of washer-like form, provided with a central aperture for journaling the member 65'' upon the boss 67', and carrying a pair of upstanding ears 68''. The ears 68'' are bored and tapped to receive adjusting screws 72 adapted to engage opposite sides of the lug 64' of the adjustment member 65'.

The adjustment means described with reference to Figure 6 provides for an angular adjustment of the position of the inverting assembly 17 with respect to the adjustment means 65', and provides an angular adjustment of the relative positions of the adjustment means 65' and the drive member 65''.

The adjustably supported elements just described are drivably interrelated in the following manner. A driving belt 71, preferably formed of spring steel and functioning in a manner analogous to the endless bands used on drafting machines, is secured at one end as by means of a screw 73 to the outer cylindrical surface of the adjustment member 65. The band 71 is carried around the cylindrical circumference of the sector 56 to which it is secured as by means of a screw 74 and around the reverse side of the cylindrical portion of the adjustment member 65' to which it is secured as by means of a screw 75. A tension spring 76, secured to the adjustment means 65' as by means of a screw 75 and connected by suitable means (not shown) to one end wall of the housing 2, serves to tension the band 71 and maintain the same taut at all times.

The band 71 thus serves to drivably interengage the adjustment members 65 and 65' with the sector 56. Thus, rotation of the control knob 58 serves to shift the angular position of both of the inverting assemblies 16 and 17, and the angular position of the collimating reflector 21. It will be observed that the inverting assemblies 16 and 17 are rotated in opposite directions.

A similar flexible band 77 has one end secured as by means of a screw 78 to the driving member 65'' and is carried around the circular circumference of the lower sector 57 to which the other end is secured as by means of a screw 79. A tension spring 80 secured at one end to the band 77 as by means of a screw 81 and secured at the other end by suitable means (not shown) to an end wall of the housing 2 serves to keep the band 77 taut at all times.

The band 77 provides a driving connection between the sector 57 and the driving member 65'' so as to provide for rotation of the collimating reflector 22 in a direction opposite to the rotation of the collimating reflector 21 and coincidentally with the rotation of that reflector as a result of rotation of the control knob 58.

The cylindrical surfaces of the members 65, 65', and 65'', which are engaged by the bands 71 and 77, are made with identical radii of curvature, the radius of curvature being precisely one-half the equal radii of curvature of the sectors 56 and 57.

The operation of the adjustment means is as follows. Assuming that it is desired to increase the distance from the camera to the point of binocular convergence, the adjustment knob 58 is rotated in such direction as to move the screw 62 to the right, as viewed in Figure 8. This serves to rotate the inverting assembly 16 in a clockwise direction, and to rotate the inverting assembly 17 in a counterclockwise direction by a like amount, so as to reduce the angle included between the axes 23 and 24 (Figure 7). At the same time, the collimating reflectors 21 and 22 are angularly shifted respectively in clockwise and counterclockwise directions, but through an angle which is exactly one-half of the angular shift imparted to the inverting assemblies 16 and 17.

The provision of a two-to-one drive ratio between the reflectors 21 and 22 on the one hand, and the inverting assemblies 16 and 17 on the other, is of extreme importance, as will be apparent from the following explanation. The lines of sight 29 and 30 are fixed in their angular relation by the fixed centers of the frame areas represented by the points $S'_L$ and $S'_R$ in Figure 7. The extensions of these lines of sight, represented by the lines 27 and 28 in Figure 7, will be rotated in a horizontal plane through an angle which is exactly twice the angle through which the reflectors 21 and 22 are moved. In order for the extensions 25 and 26 of the lines of sight 27 and 28 to extend precisely parallel to the vertical axes of the inverting assemblies 16 and 17, it is necessary that the lines 27 and 28 be included in the planes which are respectively perpendicular to the planes of the intermediate reflectors 19. Since the lines 27 and 28 have been rotated through an angle which is twice the magnitude of the angle through which the mirrors 21 and 22 are moved, it follows that the mirrors 19 must also be rotated through the double angle in order to align the normal plane of incidence with the lines of sight 27 and 28.

If this compensating adjustment is not made, the vertical courses 25 and 26 will not be precisely aligned with the axes of rotation of the inverting assemblies 16 and 17, but will instead lie at an angle thereto so as to produce a deflection in the vertical plane of the ultimate lines of sight 23 and 24. Since the adjustment of the knob 58 is not intended to produce any vertical displacement of the rays 23 and 24, it is essential to provide for the compensating adjustment of the position of the inverting assemblies 16 and 17 as described.

The adjustments provided by the screws 69, 69' and 72 permit the initial alignment of the apparatus and provide also for subsequent adjustment should the apparatus become out of adjustment as the result of shocks, jars or rough handling. In making such an adjustment, one may choose as the subject S a suitably arranged and illuminated geometric figure such as a cross or target, or alternatively, one may use a point source of light. The camera may be so oriented as to dispose the subject S in the precise center of the camera field as determined by looking through the camera finder in the usual fashion. The adjustment knob 58 may then be set to indicate on the dial 59 the actual distance from the camera to the subject. With the positions of the camera and subject thus determined, and with the camera shutter open, a ground glass or similar medium may be substituted for the film 30 with the back of the camera removed so that one may observe the location on the ground glass of the two images produced. Adjustment screws 69 are then manipulated to center the image S'ʀ in a vertical direction, it being recalled that adjustment of the screw 69 will move the image S'ʀ simultaneously in a horizontal and a vertical direction. Then, adjusting screws 69' are manipulated to also center the image S'ʟ in a vertical direction.

At this point, the orientation of the entire camera assembly is adjusted on the tripod head, if necessary, to center the image S'ʟ in the horizontal or lateral direction. If the apparatus has been properly aligned in manufacture, and the mounting of the attachment before the camera has been precisely done, no adjustment of the angular orientation of the camera assembly as a whole should be required. However, if any adjustment of the orientation of the camera is required, such an adjustment is made and then the finder is checked to see whether the subject S has been displaced substantially from the center of the finder field. If such a discrepancy is noted, the finder orientation may be adjusted by the means usually provided on motion picture cameras to realign the finder and bring the center of the field of view into coincidence with the subject S. Finally, the adjusting screw 72 is manipulated to center the image S'ʀ in the lateral direction.

While the above described procedure is not necessarily recommended as the procedure to be followed in adjusting the apparatus, it serves to illustrate the effect of the individual adjustments provided. It will be seen that, aside from the procedure to be followed, the adjustment means 69, 69' and 72 provide for the proper alignment and orientation of the images S'ʟ and S'ʀ on their individual frame areas.

With the apparatus adjusted as described, the camera is used in the normal fashion to take motion pictures of any desired subject. In taking such pictures, a slight adjustment of the exposure time may be required to compensate for the light losses in the attachment, and due care must be exercised to properly set the adjustment knob 58 to dispose the point of binocular convergence in the same depth plane as that occupied by the object of principal interest in the scene being photographed. Also, the matt 35a is inserted to properly space the images on the film.

After exposure, the film is processed in the usual manner, and is ready for projection. In projecting the film, the attachment 1 is removed from the camera and mounted in a similar position before the objective lens of the motion picture projector. Before projecting the actual photographs, the apparatus is adjusted by placing in the aperture of the projector a prepared section of film strip bearing images corresponding to the images S'ʟ and S'ʀ, positioned precisely in the center of their respective frame areas. The knob 58 is then adjusted to bring the projected images into registration on the projection screen. Thereafter, the photographic film may be projected in the usual fashion, the matt 35a being removed and polarizing filters being inserted into the filter-receiving guides 13, 14, the superimposed projected pictures being viewed through spectacles fitted with polarizing filters in the well known manner.

Certain inventions disclosed in the foregoing, but not claimed herein, form the subject matter of my copending application Serial No. 318,437, filed November 3, 1952, and entitled "Method of Stereoscopic Photography and Film Produced Thereby."

From the foregoing, it will be observed that this invention provides a stereoscopic attachment for use on motion picture cameras and projectors, and that the attachment provides new and advantageous results superior to those which have been achieved prior to this invention. The advantages of the described construction reside particularly in the provision of the inverting assemblies 16 and 17 to so dispose the images on the photographic film as to orient the length and breadth of the images in the usual and customary fashion in respect to the length and breadth of the frame area upon which such images are recorded. Another outstanding advantage of the present invention is the provision of the adjustment means which permits the apparatus to be realigned and readjusted should the alignment be disturbed as a result of accidents or hard usage.

Finally, attention is directed particularly to the provision of the adjustment knob 58 and the mechanism controlled thereby, permitting the photographer to dispose the point of binocular convergence in the same depth plane as the subject of principal interest included in the field of view of the camera to prevent the creation of the unreal and disturbing illusions which result from having the point of binocular convergence located at a different depth plane than that occupied by the subject of principal interest. Although the apparatus has been described in connection with sixteen-millimeter motion picture equipment, it is equally well adapted for use with thirty-five-millimeter apparatus, and may also be used with single exposure cameras and projectors such as are used in the taking and projecting of lantern slides.

While there has been shown and described the preferred embodiment of this invention, the same is not to be limited to the details of construction illustrated and described except as defined in the appended claims.

I claim:

1. In a stereoscopic apparatus for use with a camera having a lens for producing upon a frame area a real image of a subject disposed in the field of view of said camera, the combination of: a pair of objective reflectors associated with said lens defending a pair of laterally spaced view points; collimating means for directing into said lens light transmitted from said subject to each of said reflectors to produce upon said frame area in side-by-side relation a pair of stereoscopically related images of said subject as seen from said view points; inverting means between each of said reflectors and said lens, said reflectors, inverting means, and collimating means being arranged to direct said light successively along three axes disposed mutually at right angles to thereby rotate said images ninety degrees in the plane of said frame area; mounting means mounting each reflector and inverting means associated therewith for unitary angular displacement about a vertical axis; and coupling means interconnecting said mounting means to produce a given angular clockwise displacement of one reflector and inverting means in response to a given angular counterclockwise displacement of the other, to thereby permit adjustment of the distance from said lens to the point of binocular convergence.

2. In a stereoscopic apparatus for use with a camera having a lens for producing upon a frame area a real image of a subject disposed in the field of view of said camera, the combination of: a pair of objective reflectors associated with said lens defining a pair of laterally spaced view points; collimating means for directing into said lens light transmitted from said subject to each of said reflectors to produce upon said frame area in side-by-side relation a pair of stereoscopically related images of said subject as seen from said view points; inverting means between each of said reflectors and said lens, said reflectors, inverting means, and collimating means being arranged to direct said light successively along three axes disposed mutually at right angles to thereby rotate said images ninety degrees in the plane of said frame area; mounting means mounting each reflector and inverting means associated therewith for unitary angular displacement about a vertical axis; coupling means interconnecting said mounting means to produce a given angular clockwise displacement of one reflector and inverting means in response to a given angular counterclockwise displacement of the other; and control means drivably engaged with said coupling means for effecting said angular displacements to thereby adjust the distance from said lens to the point of binocular convergence.

3. In a stereoscopic apparatus for use with a camera having a lens for producing upon a frame area a real image of a subject disposed in the field of view of said camera, the combination of: a pair of objective reflectors associated with said lens defining a pair of laterally spaced view points; collimating means for directing into said lens light transmitted from said subject to each of said reflectors to produce upon said frame area in side-by-side relation a pair of stereoscopically related images of said subject as seen from said view points; inverting means between each of said reflectors and said lens, said reflectors, inverting means, and collimating means being arranged to direct said light successively along three axes disposed mutually at right angles to thereby rotate said images ninety degrees in the plane of said frame area; mounting means mounting each reflector and the inverting means associated therewith for unitary angular displacement about a vertical axis; another mounting means mounting said collimating means for independent angular displacement about a vertical axis; and drive means interconnecting all of said mounting means and operable to angularly displace said collimating means in opposite directions by like amounts and to displace each of said reflectors and inverting means in the same direction and by twice the amount of the displacement of the corresponding collimating means, to thereby permit adjustment of the distance from said lens to the point of binocular convergence.

4. In a stereoscopic apparatus for use with a camera having a lens for producing upon a frame area a real image of a subject disposed in the field of view of said camera, the combination of: a pair of objective reflectors associated with said lens defining a pair of laterally spaced view points; collimating means for directing into said lens light transmitted from said subject to each of said reflectors to produce upon said frame area in side-by-side relation a pair of stereoscopically related images of said subject as seen from said view points; inverting means between each of said reflectors and said lens, said reflectors, inverting means, and collimating means being arranged to direct said light successively along three axes disposed mutually at right angles to thereby rotate said images ninety degrees in the plane of said frame area; mounting means mounting each reflector and inverting means associated therewith for unitary angular displacement about a vertical axis; coupling means interconnecting said mounting means to produce a given angular clockwise displacement of one reflector and inverting means in response to a given angular counterclockwise displacement of the other, to thereby permit adjustment of the distance from said lens to the point of binocular convergence; and adjustment means interposed between said coupling means and one of said mounting means for angularly shifting said one of said mounting means independently of the other.

5. In a stereoscopic apparatus for use with a camera having a lens for producing upon a frame area a real image of a subject disposed in the field of view of said camera, the combination of: a pair of objective reflectors associated with said lens defining a pair of laterally spaced view points; collimating means for directing into said lens light transmitted from said subject to each of said reflectors to produce upon said frame area in side-by-side relation a pair of stereoscopically related images of said subject as seen from said view points; inverting means between each of said reflectors and said lens, said reflectors, inverting means, and collimating means being arranged to direct said light successively along three axes disposed mutually at right angles to thereby rotate said images ninety degrees in the plane of said frame area; mounting means mounting each reflector and the inverting means associated therewith for unitary angular displacement about a vertical axis; another mounting means mounting said collimating means for independent angular displacement about a vertical axis; drive means interconnecting all of said mounting means and operable to angularly displace said collimating means in opposite directions by like amounts and to displace each of said reflectors and inverting means in the same direction and by twice the amount of the displacement of the corresponding collimating means, to thereby permit adjustment of the distance from said lens to the point of binocular convergence; adjustment means interposed between said drive means and one of said mounting means for angularly shifting one of said reflectors and inverting means independently of the other; and another adjustment means interposed between said drive means and another of said mounting means for angularly shifting one of said collimating means independently of the other and independently of said reflectors and inverting means.

6. In a stereoscopic apparatus for use with a camera having a lens for producing upon a frame area a real image of a subject disposed in the field of view of said camera, the combination of: a pair of objective reflectors associated with said lens defining a pair of laterally spaced view points; collimating means for directing into said lens light transmitted from said subject to each of said reflectors to produce upon said frame area in side-by-side relation a pair of stereoscopically related images of said subject as seen from said view points; inverting means between each of said reflectors and said lens, said reflectors, inverting means, and collimating means being arranged to direct said light successively along three axes disposed mutually at right angles to thereby rotate said images ninety degrees in the plane of said frame area; mounting means mounting each reflector and inverting means associated therewith for unitary angular displacement about a vertical axis; a cylindrical member secured to each of said mounting means for rotating the associated reflector and inverting means in response to rotation of said cylindrical member; a flexible band extending between said cylindrical members and partially encircling each member for rotating one of said members in response to rotation of the other; a radially extending lug on said other cylindrical member; and a manually operable screw means disposed to engage said lug, whereby rotation of said screw means produces a simultaneous angular displacement of both of said cylindrical members.

7. In a stereoscopic apparatus for use with a camera having a lens for producing upon a frame area a real image of a subject disposed in the field of view of said camera, the combination of: a pair of objective reflectors associated with said lens defining a pair of laterally spaced view points; collimating means for directing into said lens light transmitted from said subject to each of said reflectors to produce upon said frame area in side-by-side relation a pair of stereoscopically related images of said subject as seen from said view points; inverting means between each of said reflectors and said lens, said reflectors, inverting means, and collimating means being arranged to direct said light successively along three axes disposed mutually at right angles to thereby rotate said images ninety degrees in the plane of said frame area; mounting means mounting each reflector and inverting means associated therewith for unitary angular displacement about a vertical axis; coupling means interconnecting said mounting means to produce a given angular clockwise displacement of one reflector and inverting means in response to a given angular counterclockwise displacement of the other, to thereby permit adjustment of the distance from said lens to the point of binocular convergence; and adjustment means interposed between said coupling means and one of said mounting means for angularly shifting one of said mounting means independently of the other, said adjustment means comprising a member associated with said coupling means, a pair of spaced lugs on said member, a pair of aligned adjusting screws threaded into said lugs, and a rib on said mounting means disposed between said lugs in a position to be engaged on opposite sides by said screws, whereby manipulation of said screws adjusts the angular relation between said mounting means and said coupling means.

8. In a stereoscopic apparatus for use with a camera having a lens for producing upon a frame area a real image of a subject disposed in the field of view of said camera, the combination of: a pair of objective reflectors associated with said lens defining a pair of laterally spaced view points; a pair of collimators for directing into said lens light transmitted from said subject to each of said reflectors to produce upon said frame area in side-by-side relation a pair of stereoscopically related images of said subject as seen from said view points; mounting means mounting each of said reflectors for angular displacement about a vertical axis; another mounting means mounting said collimators for independent angular displacement about a vertical axis; and drive means interconnecting all of said mounting means and operable to angularly displace said collimators in opposite directions and by like amounts and to displace each of said reflectors in the same direction and by twice the amount of the displacement of the corresponding collimator, to thereby permit adjustment of the distance from said lens to the point of binocular convergence.

9. In a stereoscopic apparatus for use with a camera having a lens for producing upon a frame area a real image of a subject disposed in the field of view of said camera, the combination of: a pair of objective reflectors associated with said lens defining a pair of laterally spaced view points; collimating means for directing into said lens light transmitted from said subject to each of said reflectors to produce upon said frame area in side-by-side relation a pair of stereoscopically related images of said subject as seen from said view points; mounting means mounting each of said reflectors for angular displacement about a vertical axis; coupling means interconnecting said mounting means to produce a given angular clockwise displacement of one reflector in response to a given angular counterclockwise displacement of the other, to thereby permit adjustment of the distance from said lens to the point of binocular convergence; and adjustment means interposed between said coupling means and one of said mounting means for angularly shifting said one of said mounting means independently of the other.

10. In a stereoscopic apparatus for use with a camera having a lens for producing upon a frame area a real image of a subject disposed in the field of view of said camera, the combination of: a pair of objective reflectors associated with said lens defining a pair of laterally spaced view points; a pair of collimating means for directing into said lens light transmitted from said subject to each of said reflectors to produce upon said frame area in side-by-side relation a pair of stereoscopically related images of said subject as seen from said view points; mounting means mounting each reflector for angular displacement about a vertical axis; another mounting means mounting said collimating means for independent angular displacement about a vertical axis; drive means interconnecting all of said mounting means and operable to angularly displace said collimating means in opposite directions by like amounts and to displace each of said reflectors in the same direction and by twice the amount of the displacement of the corresponding collimating means, to thereby permit adjustment of the distance from said lens to the point of binocular convergence; adjustment means interposed between said drive means and one of said mounting means for angularly shifting one of said reflectors independently of the other; and another adjustment means interposed between said drive means and another of said mounting means for angularly shifting one of said collimating means independently of the other and independently of said reflectors.

11. In a stereoscopic apparatus for use with a camera having a lens for producing upon a frame area a real image of a subject disposed in the field of view of said camera, the combination of: a pair of objective reflectors associated with said lens defining a pair of laterally spaced view points; collimating means for directing into said lens light transmitted from said subject to each of said reflectors to produce upon said frame area in side-by-side relation a pair of stereoscopically related images of said subject as seen from said view points; mounting means mounting each reflector for angular displacement about a vertical axis; a cylindrical member secured to each of said mounting means for rotating the associated reflector in response to rotation of said cylindrical member; a flexible band extending between said cylindrical members and partially encircling each member for rotating one of said members in response to rotation of the other; a radially extending lug on said other cylindrical member; and a manually operable screw means disposed to engage said lug, whereby rotation of said screw means produces a simultaneous angular displacement of both of said cylindrical members.

12. In a stereoscopic apparatus for use with a camera having a lens for producing upon a frame area a real image of a subject disposed in the field of view of said camera, the combination of: a pair of objective reflectors associated with said lens defining a pair of laterally spaced view points; collimating means for directing into said lens light transmitted from said subject to each of said reflectors to produce upon said frame area in side-by-side relation a pair of stereoscopically related images of said subject as seen from said view points; mounting means mounting each reflector for angular displacement about a vertical axis; coupling means interconnecting said mounting means to produce a given angular clockwise displacement of one reflector in response to a given angular counterclockwise displacement of the other, to thereby permit adjustment of the distance from said lens to the point of binocular convergence; and adjustment means interposed between said coupling means and one of said mounting means for angularly shifting one of said mounting means independently of the other, said adjustment means comprising a member associated with said coupling means, a pair of spaced lugs on said member, a pair of aligned adjusting screws threaded into said lugs, and a rib on said mounting means disposed between said lugs in a position to be engaged on opposite sides by said screws, whereby manipulation of said screws adjusts the angular relation between said mounting means and said coupling means.

FRIEND F. BAKER.

REFERENCES CITED

The following references are of record in the file of this patent:

UNITED STATES PATENTS

| Number | Name | Date |
|---|---|---|
| 1,929,685 | Feil | Oct. 10, 1933 |
| 2,282,947 | Sherbinin | May 12, 1942 |
| 2,403,733 | Mainardi et al. | July 9, 1946 |

FOREIGN PATENTS

| Number | Country | Date |
|---|---|---|
| 100,978 | Australia | Nov. 9, 1935 |
| 491,578 | Great Britain | Nov. 30, 1936 |
| 110,729 | Australia | May 28, 1940 |
| 116,573 | Australia | Feb. 10, 1943 |